United States Patent [19]
Wolf et al.

[11] Patent Number: 5,555,507
[45] Date of Patent: Sep. 10, 1996

[54] METHOD FOR DETECTING NON-LINEAR BEHAVIOR IN A DIGITAL DATA TRANSMISSION PATH TO BE EXAMINED

[75] Inventors: Andreas Wolf; Hans W. Arweiler, both of Berlin, Germany

[73] Assignee: Siemens Aktiengesellschaft, München, Germany

[21] Appl. No.: 295,650

[22] PCT Filed: Feb. 3, 1993

[86] PCT No.: PCT/DE93/00109

§ 371 Date: Aug. 26, 1994

§ 102(e) Date: Aug. 26, 1994

[87] PCT Pub. No.: WO93/17348

PCT Pub. Date: Sep. 2, 1993

[30] Foreign Application Priority Data

Feb. 26, 1992 [DE] Germany .................. 42 06 454.6

[51] Int. Cl.⁶ ................................................ H04B 3/46
[52] U.S. Cl. ............... 364/553; 364/485; 364/724.06; 324/76.19; 455/63; 370/17
[58] Field of Search .................. 370/13, 14, 17; 178/69 A; 455/63, 67.1, 67.3, 67.4, 67.6; 375/224, 226; 371/20.1, 20.4; 364/484, 485, 576, 717, 717.5, 724.06, 726, 553; 324/33, 76.19

[56] References Cited

U.S. PATENT DOCUMENTS

| | | | |
|---|---|---|---|
| 3,689,884 | 9/1972 | Tew, Jr. ........................... | 340/146.1 |
| 3,866,217 | 2/1975 | Bennett, Jr. ...................... | 340/416 |
| 4,384,354 | 5/1983 | Crawford et al. ................ | 364/554 |
| 4,441,192 | 4/1984 | Kita et al. ........................ | 375/14 |
| 5,054,035 | 10/1991 | Tarallo et al. ................... | 375/10 |
| 5,274,669 | 12/1993 | Klank et al. ..................... | 375/11 |
| 5,371,760 | 12/1994 | Allen et al. ...................... | 375/1 |
| 5,392,314 | 2/1995 | Wolf ................................ | 375/10 |

Primary Examiner—Emanuel T. Voeltz
Assistant Examiner—Craig Steven Miller
Attorney, Agent, or Firm—Kenyon & Kenyon

[57] ABSTRACT

The transmission path (4) is fed with a test signal (M'), which is generated from a sequence (m) of spectral components (S1 . . . S10), which are distributed equidistantly in the frequency domain, as the result of combining with an additional function (ZSF). The additional function (ZSF) is selected so as to allow the test signal (M') to contain, besides the spectral components (S1 . . . S10) of the sequence (m), additional spectral components (ZS1 . . . ZS21). An output signal (M") received on the output side of the path is evaluated at evaluation frequencies (AW1 . . . AW10), in the case of which the test signal (M') is free per se of spectral components and, in the case of which, the test signal (M'), after a self-convolution, exhibits additional spectral components (SA1 . . . SA10). The additional spectral components (SA1 . . . SA10) occurring at the evaluation frequencies (AW 1 . . . AW 10) allow a non-linearity of the transmission path (4) to be immediately detected.

18 Claims, 2 Drawing Sheets

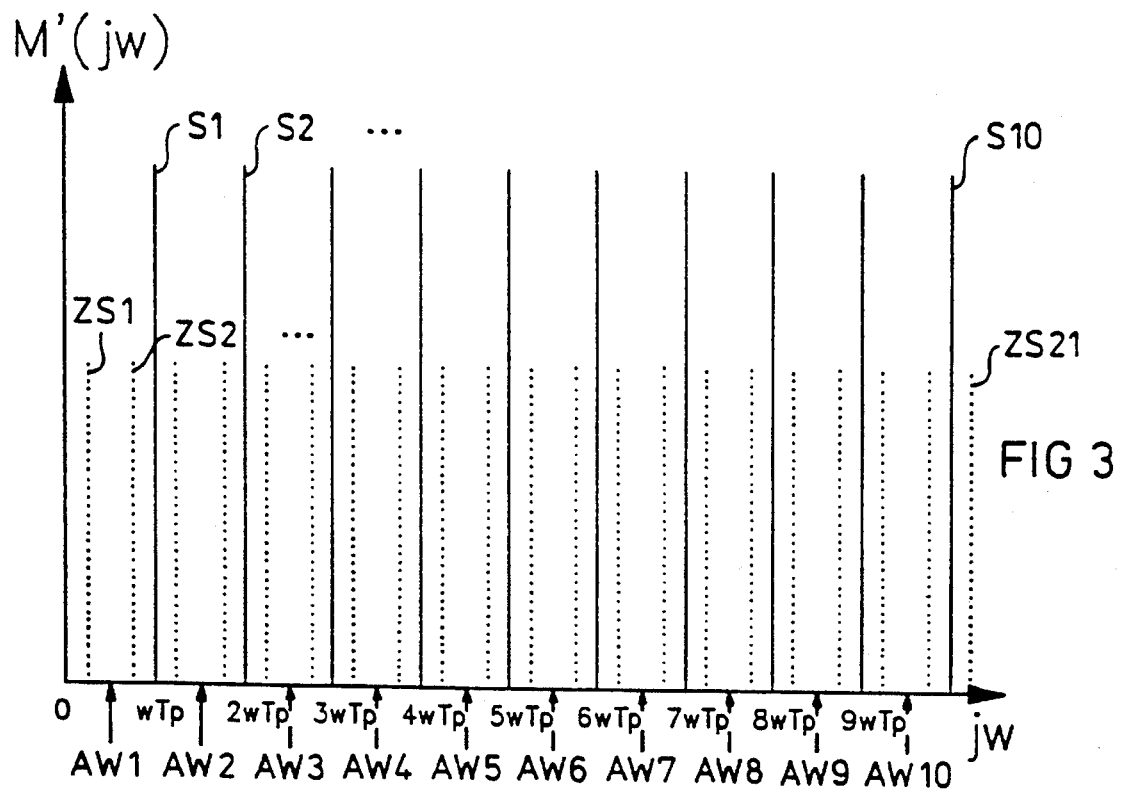
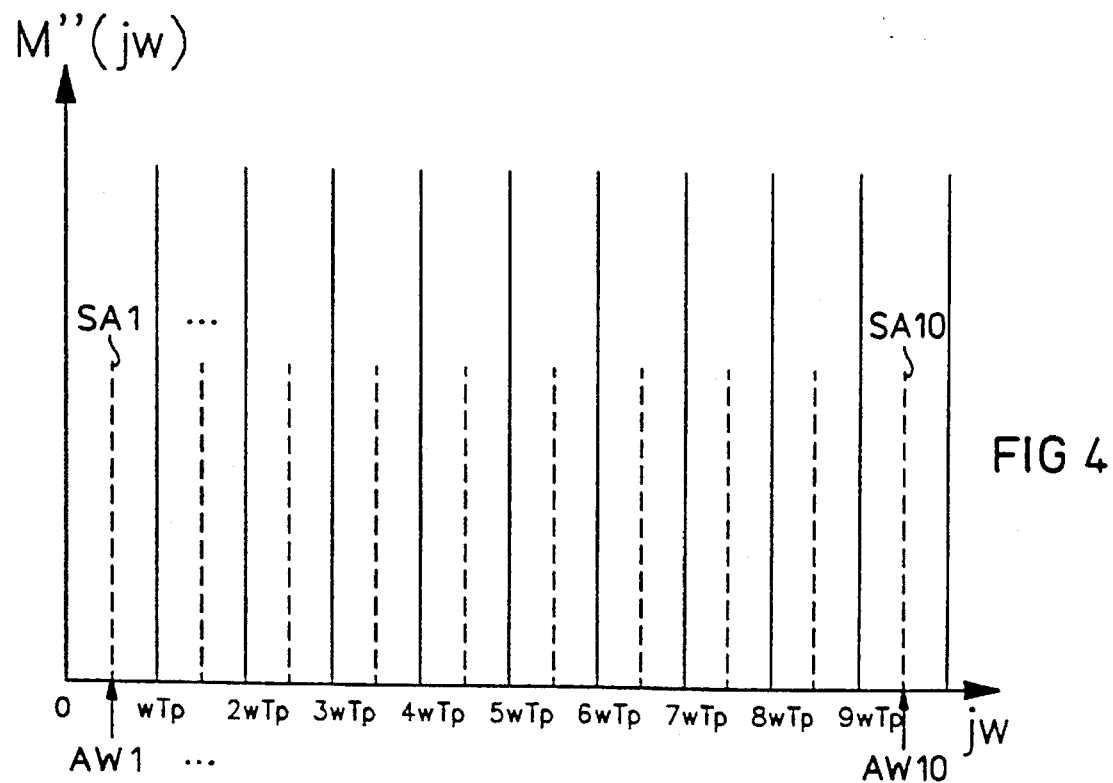

METHOD FOR DETECTING NON-LINEAR BEHAVIOR IN A DIGITAL DATA TRANSMISSION PATH TO BE EXAMINED

This application is a Rule 371 continuation of PCT/DE 93/00109, filed Feb. 3, 1993

BACKGROUND OF THE INVENTION

The present invention relates generally to techniques for analyzing the performance of a digital data transmission path, and more particularly to a technique for analyzing a digital data transmission path by transmitting a known test signal, receiving the resulting output signal and correlating the received signal with the test signal to determine the transfer function of the digital data transmission path.

GB Patent 11 60 271 discloses a process for detecting the impulse response of a digital data transmission path to be examined, in which a digital random signal is transmitted as a test signal on the input side of the path. An output signal received on the output side of the transmission path in response to the test signal is cross-correlated for purposes of evaluation with the test signal, which test signal is delayed as needed. From the cross-correlation, a function is obtained, which corresponds to the transfer function of the data transmission path to be examined.

If the—generally at first unknown—transfer function of the data transmission path to be examined exhibits non-linearities, then cumulative and differential frequencies occur in the received output signal that lie within the spectrum of the output signal caused by the frequencies of the spectral lines of the emitted test signal. Thus, these spectral components caused by non-linearities cannot be separated from the spectral components of the output signal describing the transfer function. This means that the thus determined transfer function conforms with the actual transfer function of the transmission path to be examined, only if the transmission path is linear, while with increasing non-linearity, there is a considerable deviation between the measured and the actual transfer function.

In the case of a process disclosed by AT-B-380 960 for selective attenuation-transmission measurements in low-frequency transmission systems, the system is fed on the input side with a test signal controlled by a clock-pulse generator and having equidistant spectral lines of the same amplitude of a random-noise generator. The filters of a clock-pulse-generator-controlled matched filter are adjusted to the spectral lines of the test signal. The attenuation ratio can be inferred from the signal level ratio between the test signal and the output signal. In this system, it is not possible to detect and eliminate distortions caused by non-linearities on the system.

A process for determining the transmission properties of an electrical line is disclosed by the non-pre-published WO 92/17949, in the case of which a binary, bipolar random-sequence signal having the crest factor 1 is used as a test signal. Possibilities for determining non-linear behavior of the line are not addressed.

German A1-26 37 775 describes a process for assessing the transfer function of a system, wherein the system is excited on the input side by short-period, transient, broad-band noise signals. As a result of non-linearities of the system, distortions contained in the output signals are eliminated by generating the average value of the output signals from a plurality of individual measurements. It is, thus, possible to estimate the transfer function within a given range of accuracy; the known process can neither be used to detect nor to qualitatively assess a non-linear performance of a system.

The present invention is directed to the problem of developing a process to reliably and simply detect the non-linear behavior of a digital data transmission path to be examined and, from that, to assess, as needed, the quality of a transfer function to be determined.

SUMMARY OF THE INVENTION

The present invention solves this problem by providing a method for detecting the non-linear behavior of h digital data transmission path to be examined, in which:

a test signal is generated that is composed of a sequence of spectral components distributed equidistantly in the frequency domain, which test signal is then is combined with such an additional function of the kind that allows the test signal to contain, besides the spectral components of the sequence, additional, preferably at least partially equidistant spectral components;

the transmission path is periodically fed this test signal at its input; and an output signal received on the output side of the path, in response to the test signal, is evaluated at specified evaluation frequencies. These frequencies that are selected as evaluation frequencies are such that the test signal is free per se of spectral components. In addition, the test signal, after a self-convolution in the frequency domain, exhibits additional spectral components.

The important realization underlying the process according to the present invention is that by modifying a periodically emitted sequence through the application of an additional signal, spectral components attributable to non-linearities occur separately from the spectral components of the original sequence and can, thus, be evaluated separately. As a general principle, a non-linear transfer function contains components raised to the second power and/or components raised to a higher power. These components effect a multiplication of the test signal, which corresponds to a self-convolution of the test signal in the frequency domain. The evaluation frequencies are matched to the additional spectral components caused by the self-convolution, so that the spectral components of the output signal occurring at the evaluation frequencies can be simply, selectively, immediately and advantageously evaluated as an indication of non-linearity of the transmission path. A further advantage of the invention consists in that a measure for the non-linearity is able to be derived from the additional spectral components.

The applied sequence can be cumulatively combined with the additional function, which exhibits, for example, a spectrum of a so-called δ-(delta) comb.

An advantageous extension of the method according to the present invention with respect to generating the test signal consists in that the sequence is multiplicatively combined with the additional function.

In this connection, is has proven to be particularly effective to use a trigonometric function, in particular a sine or cosine function, as a special function.

The method according to the invention is able to be developed quite advantageously in that a binary, bipolar, random sequence signal having a crest factor of preferably one is used as a sequence, that the output signal is cross-correlated with a reference signal corresponding to the test signal to extract a measuring signal within the time domain, or is multiplied in the frequency domain, and that the measuring signal is evaluated in dependence upon the size of the additional spectral components. In this refinement, the method according to the present invention is able to be simply combined with a method described by German Patent Application P 41 10 439.0-35 (which is hereby incorporated by reference), in which the output signal is cross-correlated with, or rather multiplied by a reference signal corresponding to the test signal, to extract a measuring signal; by means of a correspondingly expanded and additional sampling of the measuring signal at the evaluation frequencies, the measuring signal can be drawn upon both for determining the transmission properties, as well as for detecting a (possibly no longer tolerable) non-linearity of the data-transmission path. It is considered to be particularly advantageous that, when a value of a specific additional spectral component is exceeded, the determined transfer function and, in some instances, additional transmission properties are at least characterized as faulty.

BRIEF DESCRIPTION OF THE DRAWINGS

FIG. 3 shows a test signal gained by combining the sequence with the additional function.

FIG. 4 depicts an output signal received on the outgoing side of the path.

DETAILED DESCRIPTION

Figure 1:
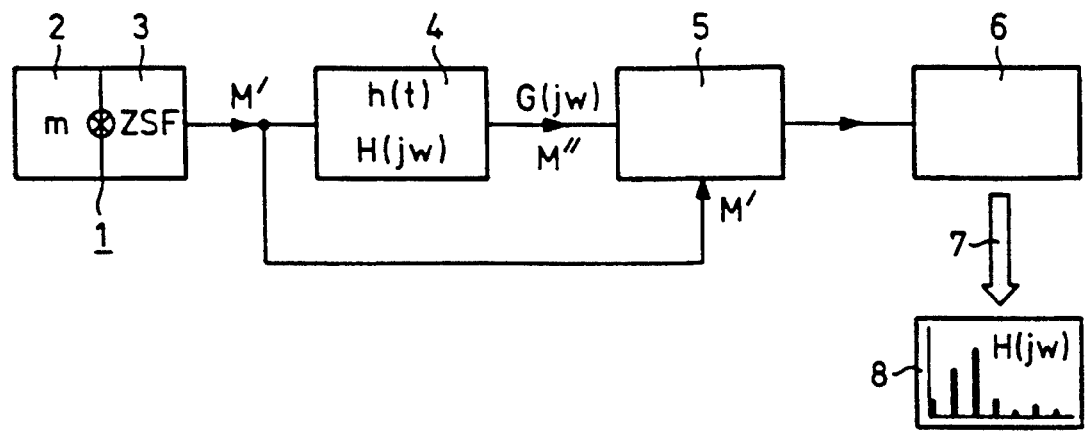
FIG. 1 schematically depicts an exemplary embodiment of an arrangement for implementing the process according to the invention.

In accordance with FIG. 1, a generator 1 is provided for generating a test signal M'. The generator 1 contains a pseudo-random generator 2 for generating $2^n$-m sequences (compare Semiconductor Circuit Technology, Tietze/Schenk, 1980, pp. 509–512). A $2^n$-m sequence m generated by the pseudo-random generator 2 can consist of the following numerical sequence $$m(n)=(1001011001111100011011101010000) \qquad \text{Eq-(1)}$$

in which $0 \leq n \leq 30$. By allocating the binary values 0 and 1 to the bipolar values −1 and +1, a binary, bipolar signal is obtained, which has a crest factor (peak value/effective value) of 1.

The spectrum of such a periodically emitted sequence m is generally to be described by a frequency-discrete si-function $$M(j\omega) = si\left(\frac{\omega T_p}{2}\right) \cdot \delta_{\omega p}(\omega) \qquad \text{Eq.-(2)}$$

in which $T_p$ represents the period of the m-sequence m; $\omega_p = 2\pi/T_p$, and $\delta_{107\ p}(\omega)$ is a delta comb.

Delta comb is understood to be a function, which is made up of delta pulses arranged in a specified, equidistant spacing (in this case $\omega_p = 2\pi/T_p$).

Figure 2:
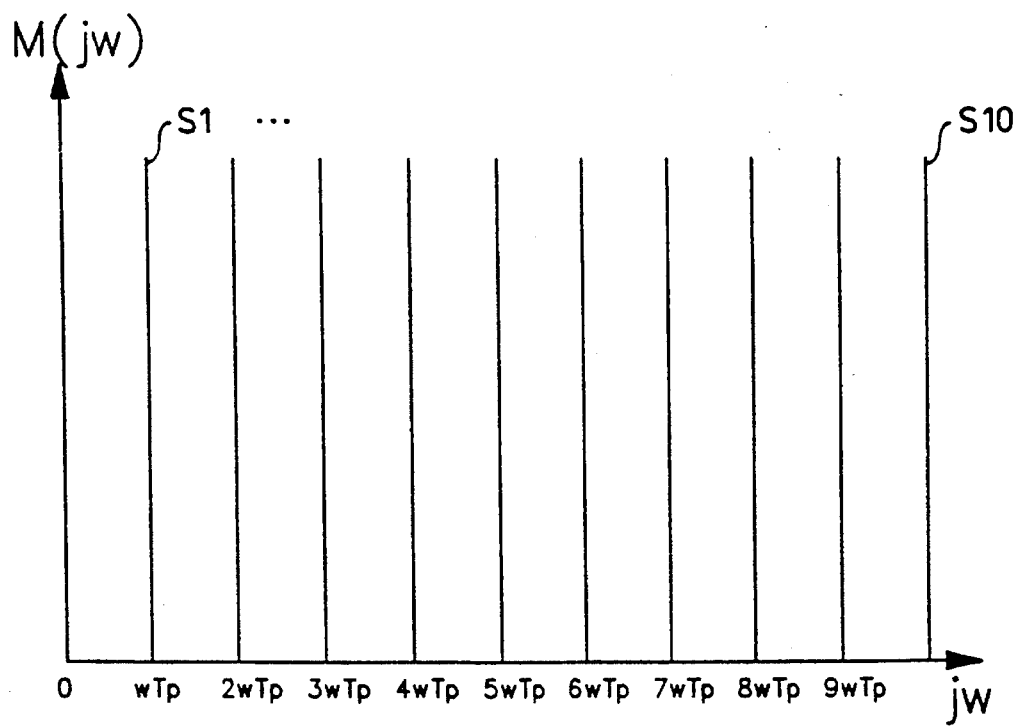
FIG. 2 shows the time characteristic of a sequence.

In accordance with FIG. 2, the periodically emitted m-sequence m has spectral lines S1 ... S10 only for $$\omega = n \cdot \frac{2\pi}{T_p} \quad n \text{ being from } N_0 \qquad \text{Eq.-(3)}$$

The spectral lines S1 ... S10 are distributed equidistantly in at least one frequency domain that is of interest for the analysis. If the m-sequence is transmitted with its spectrum in accordance with FIG. 2 via a transmission path having a non-linear transfer function, then cumulative and differential frequencies also occur in the spectrum of the received m-sequence at the frequencies in accordance with equation Eq-3. Thus, they are superimposed on the spectral lines S1 ... S10 of the transmitted, original m-sequence m, so that it is not possible to divide up and evaluate the spectrum with respect to the transfer function and with respect to the distortion resulting from non-linearities.

Therefore, the generator 1 (FIG. 1) contains a logic arrangement 3, which links an additional function ZSF to the m-sequence m. In the present exemplary embodiment, the m-sequence m is multiplied by a cosine function $$ZSF(t)=\tfrac{1}{2}+\cos(\omega_1 t) \qquad \text{Eq-(4)}$$

within the time domain.

For the spectrum $M'(j\omega)$ of a test signal M' generated as a result of this modulation of the m-sequence m with the cosine function ZSF, one obtains, under consideration of the masking-out property of the delta function $$M'(j\omega) = \left[ si\left(\frac{\omega T_p}{2}\right) \cdot \delta_{\omega p}(\omega) \right] * [\delta(\omega \pm \omega_1) + \delta(\omega)] \qquad \text{Eq.-(5)}$$

$$=M(j\omega)+M(j(\omega-\omega_1))+M(j(\omega+\omega_1)) \qquad \text{Eq-(6)}$$

wherein * represents the convolution function. If one selects, for example, $$\omega_1 = \tfrac{1}{4} T_p \qquad \text{Eq-(7)}$$

a spectrum $M'(j\omega)$ in accordance with FIG. 3 results for the test signal M', which spectrum, in addition to the original spectral components S1 ... S10 contains additional spectral components ZS1 ... ZS21, which are at least partially equidistant among themselves and are equidistant to the respective nearest spectral components S1 ... S10. Thus, spectral lines S1 ... S10 exist in the spectrum of the test signal M' for frequencies in accordance with equation Eq-3, as well as additional spectral components ZS1 ... ZS21 for $$\omega_n = n \cdot 2\pi \left(\frac{1}{T_p}\right) \pm 2\pi \left(\frac{1}{4} T_p\right) \quad n \text{ being from } N_0 \qquad \text{Eq.-(8)}$$

The ratio between the first term (cosine component) and the second term (direct component) in the second brackets of equation Eq-5 determines the height ratio of the spectral components according to FIG. 3. After being matched to the position of all spectral components of the test signal M', frequencies in accordance with the specification $$A\omega_n = n \cdot \pi \left(\frac{1}{T_p}\right) \qquad \text{Eq.-(9)}$$

are defined as evaluation frequencies AW1 ... AW10.

The test signal M' (FIG. 1) is fed to a data transmission path 4 to be examined, which has a weighting function or transfer function h(t) to be determined in the time domain or $H(j\omega)$ in the frequency domain. When considered in the frequency domain, the transfer function $H(j\omega)$ of the transmission path 4 converts the test signal M' to G, in accordance with $$G(j\omega)=H(j\omega) \cdot M(j\omega) \qquad \text{Eq-(10)}$$

$G(j\omega)$ being the output signal of the transmission path 4. This can be further evaluated, in addition to determining the transmission properties of the data transmission path 4, as clarified in greater detail in the following.

When the data transmission path 4 exhibits a non-linear behavior, the non-linear component can be approximated by a polynomial. The transfer function of the transmission path 4 can thus have, for example, a quadratic component, which also influences the test signal M', so that on the output side of the path, a received output signal M" having a spectrum that corresponds to the convolution $$M''(j\omega)=M'(j\omega)*M'(j\omega) \qquad \text{Eq-(11)}$$

while disregarding the weighting of the si-function, yields $$\approx [\delta_{\omega p}(\omega)*[\delta(\omega\pm\omega_1)+\delta(\omega)]]*[\delta_{\omega p}(\omega)*[\delta(\omega\pm\omega_1)+\delta(\omega)]] \qquad \text{Eq-(12)}$$

$$=[\delta_{\omega p}(\omega)+\delta_{\omega p}(\omega-\omega_1)+\delta_{\omega p}(\omega+\omega_1)]*[\delta_{\omega p}(\omega)+\delta_{\omega p}(\omega-\omega_1)+\delta_{107\,p}(\omega+\omega_1)] \qquad \text{Eq-(13)}$$

$$=3\delta_{\omega p}(\omega)+2\delta_{\omega p}(\omega-\omega_1)+2\delta_{\omega p}(\omega+\omega_1)+\delta_{\omega p}(\omega-2\omega_1)+\delta_{\omega p}(\omega+2\omega_1) \qquad \text{Eq-(14)}$$

The fundamental characteristic of the spectrum $M''(j\omega)$ of the output signal M" is shown in FIG. 4. The quadratic component in the transfer function of the transmission path 4 effects additional spectral components SA1 . . . SA10, whose positions described by the significant terms $$\delta_{\omega p}(\omega-2\omega_1) \text{ and } \delta_{\omega p}(\omega+2\omega_1) \qquad \text{Eq-(15)}$$

are clearly defined for non-linearities. The position of the additional spectral components SA1 . . . SA10 depends directly upon the selection for $\omega$ in accordance with Eq-7 and upon the considered term of the polynomial describing the non-linearity. Of course, given another selection for $\omega_1$ or, for example, considering a component of a higher power (for example a cubed component) of the non-linearity function, appropriate evaluations can be obtained. The additional spectral components SA1 . . . SA10 are each at the evaluation frequencies AW1 . . . AW10 and, consequently, permit a direct and simple evaluation. In the present case, the evaluation results in a considerable non-linearity of the examined transmission path 4. By comparing the output signal M" to the test signal M', a measure for the non-linearity is able to be derived, which, for example, is defined in accordance with $$V \approx \frac{\sum_{\omega=-\infty}^{+\infty}[\delta_{\omega p}(\omega-2\omega_1)+\delta_{\omega p}(\omega+2\omega_1)\cdot M''(j\omega)]}{\sum_{\omega=-\infty}^{+\infty}[\delta_{\omega p}(\omega)\cdot M''(j\omega)]} \qquad \text{Eq-(16)}$$

following the definition of the distortion factor.

Although in generating the test signal, a multiplicative logic operation was selected, a cumulative addition of a special function in the form of a cosine signal is conceivable, whose spectral lines lie, for example, at $\pm 1.5\omega T_p$.

As described in detail in German Patent Application, which is hereby incorporated by reference, having the official reference no. 41 10 439.0-35, the transfer function $H(j\omega)$ can be directly determined from the spectrum $G(j\omega)$ at the output of the transmission path 4 (FIG. 1) through convolution with the time-inverse test signal M' in a cross-correlator 5 and through subsequent Fourier transformation in a device 6 and be supplied via a data bus 7 to a display device 8. The determined measure V for the non-linearity of the transmission path 4 can—for example, when a permissible highest measure is exceeded—be advantageously used directly to suppress the display of the transfer function or at least to emit an output signal indicating the restricted quality of the determined transfer function.

The representation of the spectra in FIGS. 2 through 4 can only to be understood in sections, so that the proportions can, of course, be applied or extended in each case to the frequency domains of interest.

One refinement of the method of the present invention occurs when the sequence (m) comprises a binary, bipolar, random sequence signal with a crest factor of approximately one, and the output signal (M") is cross-correlated with a reference signal corresponding to the test signal (M') to extract a measuring signal (KKF) within the time domain, or is multiplied in the frequency domain. In this case, the measuring signal (KKF) is evaluated based upon the amplitude of the additional spectral components (SA1 . . . SA10).

We claim:

1. A method for detecting a non-linear behavior of a digital transmission path comprising the steps of:

a) generating a test signal (M') by combining a sequence (m) of spectral components (S1 . . . S10) distributed equidistantly in a predetermined frequency range with an additional function (ZSF) such that the test signal (M') comprises additional spectral components (ZS1 . . . ZS21), wherein two additional spectral components are distributed equidistantly about each of the spectral components (S1 . . . S10);

b) transmitting the test signal (M') generated in step a) periodically across the digital transmission path;

c) receiving an output signal (M") at an output of the digital transmission path in response to the test signal (M');

d) selecting predetermined evaluation frequencies (AW1 . . . AW10) as frequencies at which the test signal (M') is free of spectral components and at which the test signal (M'), after a self-convolution in the predetermined frequency domain, exhibits additional spectral components (SA1 . . . SA10); and e) evaluating the output signal (M") at the predetermined evaluation frequencies (AW1 . . . AW10).

2. The method according to claim 1, wherein the step a) of generating the test signal by combining the sequence (m) with the additional function further comprises multiplying the sequence (m) with the additional function (ZSF).

3. The method according to claim 2, wherein a trigonometric function comprises the additional function (ZSF).

4. The method according to claim 3, wherein the sequence (m) comprises a binary, bipolar, random sequence signal with a crest factor of approximately one, and further comprising the steps of:

f) cross-correlating the output signal (M") within the time domain with, or rather multiplying said output signal (M") in the frequency domain by a reference signal corresponding to the test signal (M'), in order to extract a measuring signal (KKF); and g) evaluating the measuring signal (KKF) based upon an amplitude of the additional spectral components (SA1 . . . SA10).

5. The method according to claim 2, wherein the sequence (m) comprises a binary, bipolar, random sequence signal with a crest factor of approximately one, and further comprising the steps of:

f) cross-correlating the output signal (M")within the time domain with, or rather multiplying said output signal (M") in the frequency domain by a reference signal corresponding to the test signal (M'), in order to extract a measuring signal (KKF); and g) evaluating the measuring signal (KKF) based upon amplitude of the additional spectral components (SA1 . . . SA10).

6. The method according to claim 1, wherein the sequence (m) comprises a binary, bipolar, random sequence signal with a crest factor of approximately one, and further comprising the steps of:

f) cross-correlating the output signal (M") within the time domain with, or rather multiplying said output signal (M") in the frequency domain by a reference signal corresponding to the test signal (M'), in order to extract a measuring signal (KKF); and g) evaluating the measuring signal (KKF) based upon an amplitude of the additional spectral components (SA1 ... SA10).

7. An apparatus for evaluating a digital data transmission path, comprising:

a) a generator generating a test signal that includes a first plurality of spectral components distributed equidistantly in a predetermined frequency range and a second plurality of spectral components wherein two of the second plurality of spectral components are distributed equidistantly about each of the first plurality of spectral components;

b) a transmitter transmitting the test signal (M') generated by the generator across the digital transmission path;

c) a receiver receiving an output signal (M") at an output of the digital transmission path in response to the transmitted test signal (M');

d) an evaluation means for evaluating the output signal (M") at predetermined evaluation frequencies (AW1 .. . AW10) selected as frequencies at which the test signal (M') is free of spectral components and at which the test signal (M'), after a self-convolution in the predetermined frequency domain, exhibits additional spectral components (SA1 ... SA10);

d) a cross-correlator cross-correlating the output signal (M") with the test signal (M') and outputting a cross-correlated signal; and e) a Fourier transformation circuit converting the cross-correlated signal into its frequency representation.

8. The apparatus according to claim 7, wherein said generator further comprises:

a) a pseudo-random generator generating a sequence having the first plurality of spectral components (S1 .. . S10); and b) a combinational logic circuit combining the sequence with an additional function to form the test signal.

9. The apparatus according to claim 8, further comprising:

a) a bus being coupled to the Fourier transformation circuit; and b) a display being coupled to the bus and displaying the frequency representation of the cross-correlated signal.

10. The apparatus according to claim 8, wherein the combinational logic circuit comprises a mixer mixing the sequence with the additional function.

11. The apparatus according to claim 8, wherein the combinational logic circuit comprises a mixer mixing the sequence with a trigonometric function.

12. The apparatus according to claim 8, wherein the sequence comprises a binary, bipolar, random sequence signal with a crest factor of approximately one, and said cross-correlator cross-correlates the output signal with a reference signal corresponding to the test signal, and filters a measuring signal from the output signal within the time domain.

13. The apparatus according to claim 12, further comprising a measuring device being coupled to the cross-correlator and measuring an amplitude of the measuring signal at the predetermined frequencies.

14. The apparatus according to claim 8, wherein the sequence comprises a binary, bipolar, random sequence signal with a crest factor of approximately one, and said cross-correlator multiplies the output signal with a reference signal corresponding to the test signal in the frequency domain to form a measuring signal.

15. The apparatus according to claim 14, further comprising a measuring device being coupled to the cross-correlator and measuring an amplitude of the measuring signal at the predetermined frequencies.

16. The apparatus according to claim 7, further comprising:

a) a bus being coupled to the Fourier transformation circuit; and b) a display being coupled to the bus and displaying the frequency representation of the cross-correlated signal.

17. The apparatus according to claim 7, further comprising a feedforward loop transmitting the test signal to the cross-correlator and providing appropriate delay to the test signal so that the test signal arrives simultaneously with the output signal at the cross-correlator.

18. The apparatus according to claim 17, wherein the feedforward loop has a unit transfer function.

* * * * *